(12) United States Patent  
Sasaki

(10) Patent No.: US 8,757,706 B2  
(45) Date of Patent: Jun. 24, 2014

(54) STRUCTURE FOR POSITIONING COWL TOP FOR VEHICLE

(75) Inventor: Kazutada Sasaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/876,207

(22) PCT Filed: Sep. 5, 2011

(86) PCT No.: PCT/JP2011/070104  
§ 371 (c)(1),  
(2), (4) Date: Apr. 22, 2013

(87) PCT Pub. No.: WO2012/043147  
PCT Pub. Date: Apr. 5, 2012

(65) Prior Publication Data  
US 2013/0214560 A1  Aug. 22, 2013

(30) Foreign Application Priority Data  
Sep. 28, 2010 (JP) ................. P2010-216941

(51) Int. Cl.  
*B60J 1/02* (2006.01)  
*B62D 25/08* (2006.01)

(52) U.S. Cl.  
USPC ............ 296/192; 296/96.21; 296/201

(58) Field of Classification Search  
CPC ............ B60J 1/02; B60J 1/004; B60J 1/005; B60J 1/006; B60J 10/02; B62D 25/08; B62D 25/081  
USPC ............ 296/192, 96.21, 201, 187.09, 84.1  
See application file for complete search history.

(56) References Cited

U.S. PATENT DOCUMENTS

| 4,718,712 | A | * | 1/1988 | Nakatani | 296/192 |
| 5,531,496 | A | * | 7/1996 | Zbinden et al. | 296/96.21 |
| 6,193,305 | B1 | * | 2/2001 | Takahashi | 296/192 |

(Continued)

FOREIGN PATENT DOCUMENTS

| DE | 3923687 A1 * | 1/1991 | 296/192 |
| JP | 9-193720 A | 7/1997 | |

(Continued)

OTHER PUBLICATIONS

Extended European Search Report issued on Mar. 27, 2014 in the corresponding EP Patent Application 11828708.5.

*Primary Examiner* — Glenn Dayoan  
*Assistant Examiner* — Gregory Blankenship  
(74) *Attorney, Agent, or Firm* — Carrier Blackman & Associates, P.C.; Joseph P. Carrier; William D. Blackman

(57) ABSTRACT

Disclosed is a cowl top positioning structure for determining the relative positions of a windshield and a front cowl top by means of a clip. The clip has: a cowl top mounting section to which the front cowl top is mounted; a windshield facing section facing the lower end surface of the windshield; and a reaction force generation section for generating a reaction force acting against a pushing force with which the lower end surface of the windshield pushes the windshield facing section toward the front of the vehicle body. The relative positions of the windshield and the front cowl top are determined by causing, by means of the reaction force generated by the reaction force generation section, the rear end surface of the front cowl top to abut against the lower end surface of the windshield.

7 Claims, 6 Drawing Sheets

(56) References Cited

U.S. PATENT DOCUMENTS

| | | |
|---|---|---|
| 8,641,130 B2 * | 2/2014 | Morden et al. ............ 296/187.04 |
| 2003/0006623 A1 * | 1/2003 | Cornils et al. ................. 296/93 |
| 2006/0049669 A1 | 3/2006 | Yamamoto |
| 2009/0152897 A1 | 6/2009 | Jang |
| 2013/0033071 A1 * | 2/2013 | Kurata et al. ................. 296/192 |
| 2013/0057027 A1 * | 3/2013 | Matsubara .................... 296/192 |
| 2013/0187408 A1 * | 7/2013 | Schaefer ....................... 296/192 |
| 2013/0214560 A1 * | 8/2013 | Sasaki .......................... 296/192 |
| 2013/0257102 A1 * | 10/2013 | Schaefer et al. .............. 296/192 |

FOREIGN PATENT DOCUMENTS

| | | | |
|---|---|---|---|
| JP | 10-236334 A | 9/1998 | |
| JP | 2010-064518 A | 3/2010 | |
| JP | 2011-140279 A | 7/2011 | |
| JP | 2012-240454 A * | 12/2012 | ................ B60J 1/02 |

* cited by examiner

STRUCTURE FOR POSITIONING COWL TOP FOR VEHICLE

TECHNICAL FIELD

The present invention relates to a vehicular cowl top positioning structure for positioning a windshield and a front cowl top of a vehicle body.

BACKGROUND ART

Vehicular front cowl top positioning structures of the type using brackets are conventionally known (see Patent Document 1, for example).

In the vehicular cowl top positioning structure disclosed in Patent Document 1, a windshield and a front cowl top are mounted separately to a vehicle body. More specifically, the windshield is bonded to the vehicle body, and a rear end portion of the front cowl top is lapped over a lower end portion of the windshield. An elastic seal member attached to the rear end portion of the front cowl top covers the lower end portion of the windshield so that variations in bonding position of the windshield relative to the vehicle body can be taken up to some extent.

However, each of the vehicle body, windshield and front cowl top has a dimensional tolerance and, hence, the positional relationship between the windshield and the front cowl top necessarily involves an error. If the relative position of the windshield and the front cowl top is not proper, a gap may be produced between mating surfaces of the windshield and the front cowl top. The gap is undesirable in terms of both appearance of the vehicle and protection against entry of foreign matters. Furthermore, it is desirable to reduce man-hours necessary for adjusting the relative position of the windshield and the front cowl top as much as possible.

PRIOR ART LITERATURE

Patent Document(s)

[Patent Document 1] Japanese Patent Application Laid-Open Publication (JP-A) No. 09-193720

SUMMARY OF INVENTION

Technical Problem

An object of the present invention is to provide a vehicular cowl top positioning structure which is capable of setting the relative position between a windshield and a front cowl top more effectively and easily.

Solution to Problem

In the invention according to a first aspect, there is provided a vehicular cowl top positioning structure comprising: a windshield; a front cowl top; and a clip mounted to a front part of a vehicle body between a lower end surface of the windshield and a rear end surface of the front cowl top, wherein the clip includes: a cowl top mounting section to which the front cowl top is mounted with the rear end surface thereof disposed face to face with the lower end surface of the windshield; a windshield facing section facing the lower end surface of the windshield; and a reaction force generation section for generating a reaction force tending to force the windshield facing section against the lower end surface of the windshield, wherein the reaction force generated by the reaction force generation section causes the rear end surface of the front cowl top to abut against the lower end surface of the windshield.

In the invention according to a second aspect, preferably, in a state where the clip is mounted to the vehicle body, the reaction force generation section is located forwardly of the lower end surface of the windshield in a longitudinal direction of the vehicle body and has elasticity capable of generating the reaction force.

In the invention according to a third aspect, preferably, the clip is mounted to the vehicle body in such a manner that the clip is displaceable relative to the vehicle body only in a longitudinal direction of the vehicle body.

In the invention according to a fourth aspect, preferably, the rear end surface of the front cowl top is provided with a cowl-top seal member that provides a seal between the rear end surface of the front cowl top and the lower end surface of the windshield.

In the invention according to a fifth aspect, preferably, the windshield facing section is provided with a clip seal member that provides a seal between the windshield facing section and the lower end surface of the windshield.

In the invention according to a sixth aspect, preferably, the clip includes an engagement section engaged with the front cowl top while the clip is mounted to the vehicle body, the engagement section having elasticity acting in a direction to urge the front cowl top toward the lower end surface of the windshield, a biasing force generated by the elastic engagement section for urging the front cowl top being set to be smaller than the reaction force generated by the reaction force generation section.

In the invention according to a seventh aspect, preferably, in a state where the clip is mounted to the vehicle body, the engagement section is located closer to the lower end surface of the windshield than the reaction force generation section.

Advantageous Effects of Invention

In the invention according to the first aspect, a reaction force generated by the reaction force generation section causes the rear end surface of the front cowl top to abut against the lower end surface of the windshield to thereby determine relative position between the front cowl top and the windshield. With this arrangement, it is possible to prevent generation of a gap between the windshield and the front cowl top which may otherwise occur due to dimensional variations, prevent entry of foreign matters, and improve the aesthetic appearance. Furthermore, the relative position between the windshield and the front cowl top can be determined more effectively and easily.

In the invention according to the second aspect, the reaction force generation section is an elastic section having elasticity. The elastic section generates a reaction force against a pushing force with which the elastic section is forced against a stopper of the vehicle body. The front cowl top including the clip can be brought into abutment with the windshield with simple construction.

In the invention according to the third aspect, the clip is mounted to the vehicle body in such a manner that the clip is displaceable relative to the vehicle body only in a longitudinal direction of the vehicle body. With the front cowl top being prevented from moving in a lateral direction of the vehicle body, the reaction force of the clip acts only on the windshield so that the abutting engagement of the front cowl top relative to the windshield can be achieved reliably with the necessary force.

In the invention according to the fourth aspect, the rear end surface of the front cowl top is provided with a cowl-top seal member that provides a seal between the rear end surface of the front cowl top and the lower end surface of the windshield. With this arrangement, since the cowl-top seal member has elasticity and is brought into abutment with the windshield, the interface between the front cowl top and the windshield can be surely sealed to thereby prevent entry of foreign matters into the vehicle body.

In the invention according to the fifth aspect, the windshield facing section is provided with a clip seal member that provides a seal between the windshield facing section and the lower end surface of the windshield. With this arrangement, since the clip seal member has elasticity and is about into abutment with the windshield, the interface between the front cowl top and the windshield can be surely sealed to thereby prevent entry of foreign matters into the vehicle body. Furthermore, loads that may be applied to the lower end surface of the windshield due to vibrations can be suppressed.

In the invention according to the sixth aspect, the engagement section has elasticity acting in a direction to urge the front cowl top toward the lower end surface of the windshield. The elasticity of the engagement section insures abutting engagement of the clip relative to the windshield without causing accidental separation which may otherwise occur due to a reaction force of the front cowl top.

In the invention according to seventh aspect, in a state where the clip is mounted to the vehicle body, the engagement section is located closer to the lower end surface of the windshield than the reaction force generation section. With this arrangement, the distance from the engagement section to the lower end surface of the windshield is relatively short, so that the front cowl top can be readily brought into abutment with the lower end surface of the windshield without causing distortion. This will contribute to an improvement in the sealing properties.

DESCRIPTION OF EMBODIMENTS

A preferred embodiment of the present invention will be described below with reference to the accompanying sheets of drawings.

Embodiment

Figure 1:
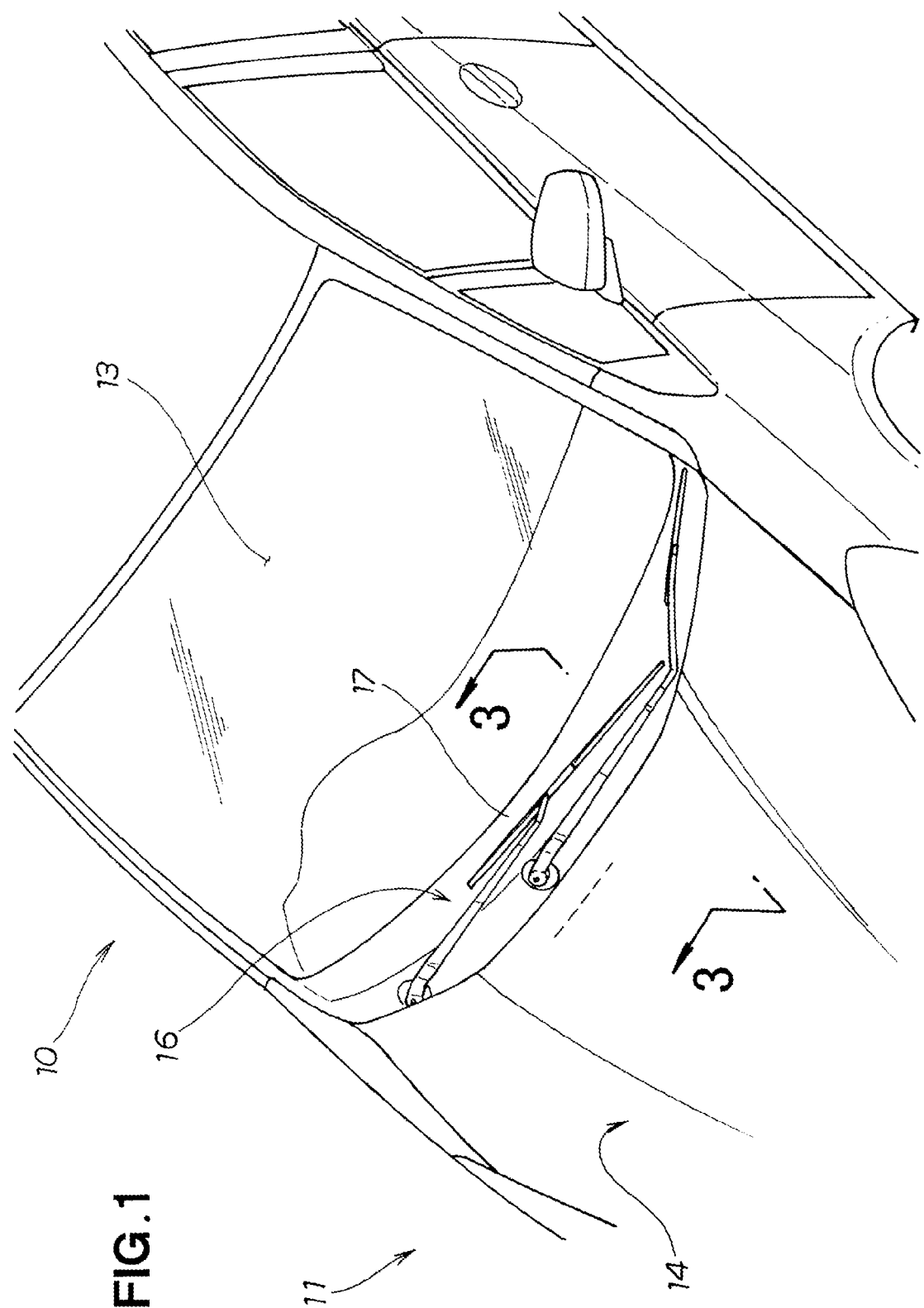
FIG. 1 is a perspective view of a vehicle front portion in which a vehicular cowl top positioning structure according to the present invention is employed.

As shown in FIG. 1, a vehicle 10 includes, at a front part of a vehicle body 11, a front cowl top 17 disposed between a lower end of a windshield 13 and a rear end of a hood 14. The hood 14 is of the front-open type in which a rear end part of the hood 14 is attached at left and right sides thereof to the vehicle body 11 so that the rear end of the hood can pop up, and a front end part of the hood 11 is lockable to the vehicle body 11 by a non-illustrated hood lock.

The front cowl top 17 is a plate-like member that covers a gap between the lower end of the windshield 13 and the rear end of the hood 14. The front cowl top 17 (hereinafter referred to, for brevity, as "cowl top 17") has portions where wiper units 16 are provided so that rain water can be wiped off from an outer surface of the windshield 13.

Figure 2:
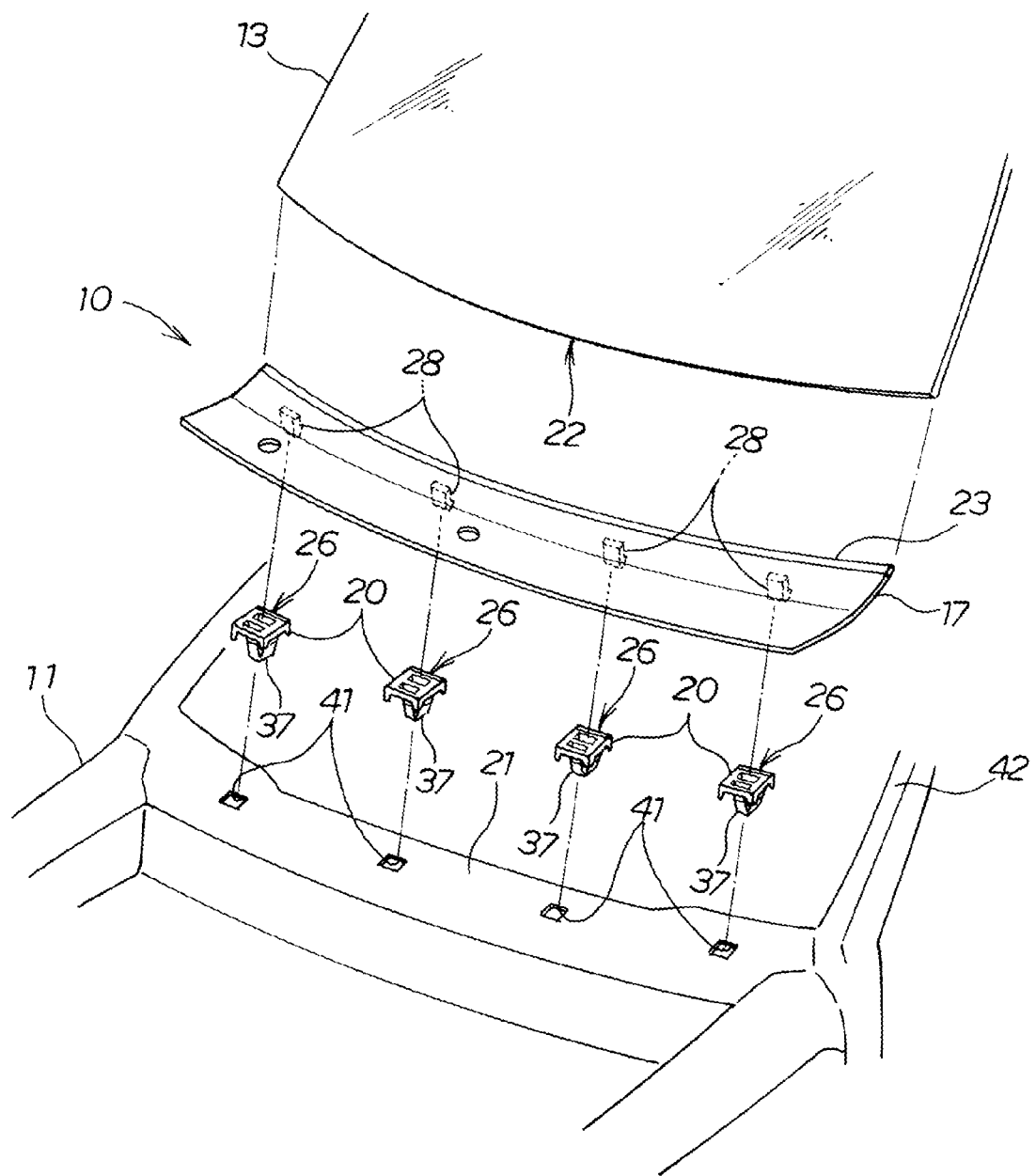
FIG. 2 is an exploded perspective view of the vehicle front portion shown in FIG. 1.

As shown in FIGS. 1 and 2, the cowl top 17 is mounted such that the clip 17 can be positioned relative to a windshield lower member 21 of the vehicle body 11 by means of a plurality of clips 20 arrayed in a transverse or width direction of the vehicle. The windshield 13 is mounted to a windshield mounting surface 42 of the vehicle body 11 in such a manner that a lower end surface 22 of the windshield 13 and a rear end surface 23 of the cowl top 17 are in abutment with each other, and the lower end surface 22 of the windshield 13 and a windshield facing section 26 of the cowl top 17 are in abutment with each other.

More specifically, the windshield lower member 21 has a plurality of attachment holes 41 extending vertically therethrough. The attachment holes 41 are arrayed in a raw in the vehicle width direction and have a rectangular shape in a plan view. Each of the clips 20 has a downwardly-extending stem section 37 inserted through a respective one of the attachment holes 41 from above, and a plurality of prongs 28 disposed on an under surface of the cowl top 17 and arrayed in the vehicle width direction is attached to the cowl top 17 from above so that the cowl top 17 is fixed to the windshield lower member 21.

Next, a description will be made on a manner in which the cowl top 17 and the windshield 13 are positioned by the clip 20.

As shown in FIGS. 3 to 6, each clip 20 is attached to the windshield lower member 21 for determining the relative position between the lower end surface 22 of the windshield 13 and the rear end surface 23 of the cowl top 17. The windshield lower member 21 forms a front part of the vehicle body 11.

The clip 20 is a single-piece component molded of synthetic resin and includes a base section 24, a cowl top mounting section 25, the windshield facing section 26, the downwardly-extending stem section 37, and a reaction force generation section 27. The base section 24 is a frame having a substantially square shape in a plan view and has four downwardly-projecting legs 35 at four respective corners of the substantially square frame. The base section 24 further has a cross member 45 extending across the frame in the vehicle width direction. The cross member 45 is located in an intermediate portion of the base section 24 in a longitudinal or front-rear direction of the vehicle. The base section 24 is formed by four frame members 44a-44d located, respectively, at a rear side, a right side, a front side, and a left side of the square base section 24.

The downwardly-extending stem section 37 extends downwardly from a longitudinally central portion of the cross member 45. The reaction force generation section 27 extends obliquely upward from a lower end of the downwardly-extending stem section 37 toward a forward direction of the vehicle in such a manner that the reaction force generation section 27 folds back from the lower end of the downwardly-extending stem section 37. The downwardly-extending stem section 37 is inserted through the corresponding attachment hole 21 of the windshield lower member 21. The stem section 37 has a pair of lateral locking prongs 43 disposed on left and right sides of the stem section 37 and extending obliquely upward from the lower end of the stem section 37 so as to lock the clip 20 in position against displacement in the vehicle width direction.

The cowl top mounting section 25 is provided on the rear frame member 44a in such a manner as to project toward the cross member 45. The windshield facing section 26 is also provided on the rear frame member 44a in such a manner as to face the lower end surface 22 of the windshield 13.

The legs 35 are brought into abutment with the windshield lower member 21 whereupon a lower surface 36 of the clip 36 is kept in a predetermined position relative to the windshield lower member 21 where the clip 20 is mounted in a stable condition with respect to both longitudinal and transverse (or front-rear and width) directions of the vehicle. An engagement section 34 is provided on the longitudinally central portion of the cross member 45 and extends obliquely downward therefrom toward the rear of the vehicle. The engagement section 34 projects toward the cowl top mounting section 25. Each of the prongs 28 extending downward from the under surface of the cowl top 17 is inserted between the engagement section 34 and the cowl top mounting section 25 of a respective one of the clips 20, and when a locking projection or pawl 29 of the prong 28 hooks on the cowl top mounting section 25, the front cowl top 17 is fixed to the clip 20.

The engagement section 34 is elastic and has elasticity tending to urge the cowl top 17 toward the lower end surface 22 of the windshield 13. The prong 28 of the cowl top 17 projects such that a rear side of the prong 28 engages the cowl top mounting section 25. The prong 28 is urged toward the windshield 13 by the engagement section 34, so that the pawl 29 is brought into hooking engagement with the cowl top mounting section 25. A biasing force generated by the elastic engagement section 34 for urging the front cowl top 18 toward the windshield 13 is set to be smaller than a reaction force generated by the reaction force generation section 27. In a state where the clip 20 is mounted to the vehicle body 11, the engagement section 34 is located closer to the lower end face 22 of the windshield 13 than the reaction force generation section 27.

The reaction force generation section 27 is an elastic arm having elasticity and, in a state where the clip 20 is mounted to the vehicle body 10, the reaction force generation section 27 is located forwardly of the lower end surface 22 of the windshield 13 in the longitudinal direction of the vehicle. By virtue of its own elasticity, the reaction force generation section 27 is able to generate a reaction force when it is forced or pressed against a stopper 31 of the vehicle body 11. The reaction force generated by the reaction force generation section 27 causes the rear end surface 23 of the cowl top 17 to abut against the lower end surface 22 of the windshield 13 so that the cowl top 17 and the windshield 13 are positioned relative to each other.

The rear end surface 23 of the front cowl top 17 is provided with a cowl-top seal member 32 that is able to provide a seal between the rear end surface 23 of the front cowl top 17 and the lower end surface 22 of the windshield 13. The cowl-top seal member 32 is elastic and hence has elasticity so that the rear end surface 23 of the front cowl top 17 and the lower end surface 22 of the windshield 13 can be surely held in close contact with each other.

The windshield facing section 26 of the clip 20 is provided with a clip seal member 33 that is able to provide a seal between the windshield facing section 26 and the lower end surface 22 of the windshield 13. The clip seal member 33 is elastic and hence has elasticity so that the windshield facing section 26 and the lower end surface 22 of the windshield 13 can be surely held in close contact with each other.

The rear end surface 23 of the front cowl top 17 and the windshield facing section 26 of the clip 20 are substantially flush with each other, so that the rear end surface 23 and the windshield facing section 26 are both engaged in providing a seal relative to the lower end surface 22 of the windshield 13. Furthermore, the elasticity of the cowl-top seal member 32 and the elasticity of the clip seal member 33 are set to be different from one another. With this arrangement, even when the rear end surface 23 and the windshield facing section 26 slightly deviate from coplanar relationship within dimensional tolerances, one seal member having smaller elasticity than the other first undergoes elastic deformation upon abutment with the lower end surface 22 to thereby ensure that both of the rear end surface 23 and the windshield facing surface 26 can reliably be in abutment with the lower end surface of the windshield 13.

The reaction force generation section 27 of the clip 20 has a groove 46 opening in a forward direction of the vehicle for fitting engagement with the stopper 31 of the windshield lower member 21. Upon fitting engagement of the groove 46 and the stopper 31, the clip 20 is fixed in position against displacement in a vertical direction. The cowl top mounting section 25 of the clip 20 has a tapered part 47 for facilitating insertion of the prong 28 during assembly.

Figure 7:
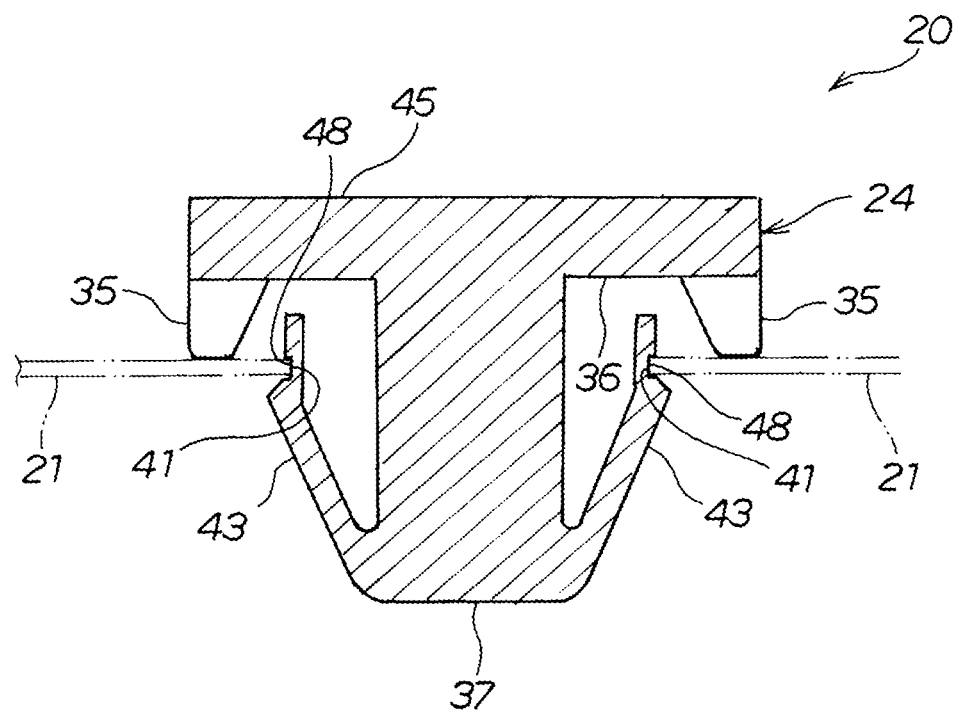
FIG. 7 is a cross-sectional view taken along line 7-7 of FIG. 5.

As shown in FIG. 7, the clip 20 has two lateral locking prongs 43, 43 extending from the lower end of the downwardly-extending stem section 37 toward the left and right sides, respectively, of the vehicle. These lateral locking prongs 43 extend obliquely upward from the lower end of the stem section 37. Each of the lateral locking prongs 43 has a lateral groove 48 formed on an outer side in the proximity of a distal end thereof, and the lateral groove 48 is in interlocking engagement with a peripheral edge of a respective one of the attachment holes 41 of the windshield lower member 21. The legs 35 and the lateral grooves 48 grip the windshield lower member 21 so that the clip 20 is surely fixed in position. Furthermore, by virtue of the lateral locking prongs 43, the clip 20 is limited from moving in a left-and-right direction in this figure.

Next, effects of the foregoing vehicular cowl top positioning structure will be described.

Figure 3:
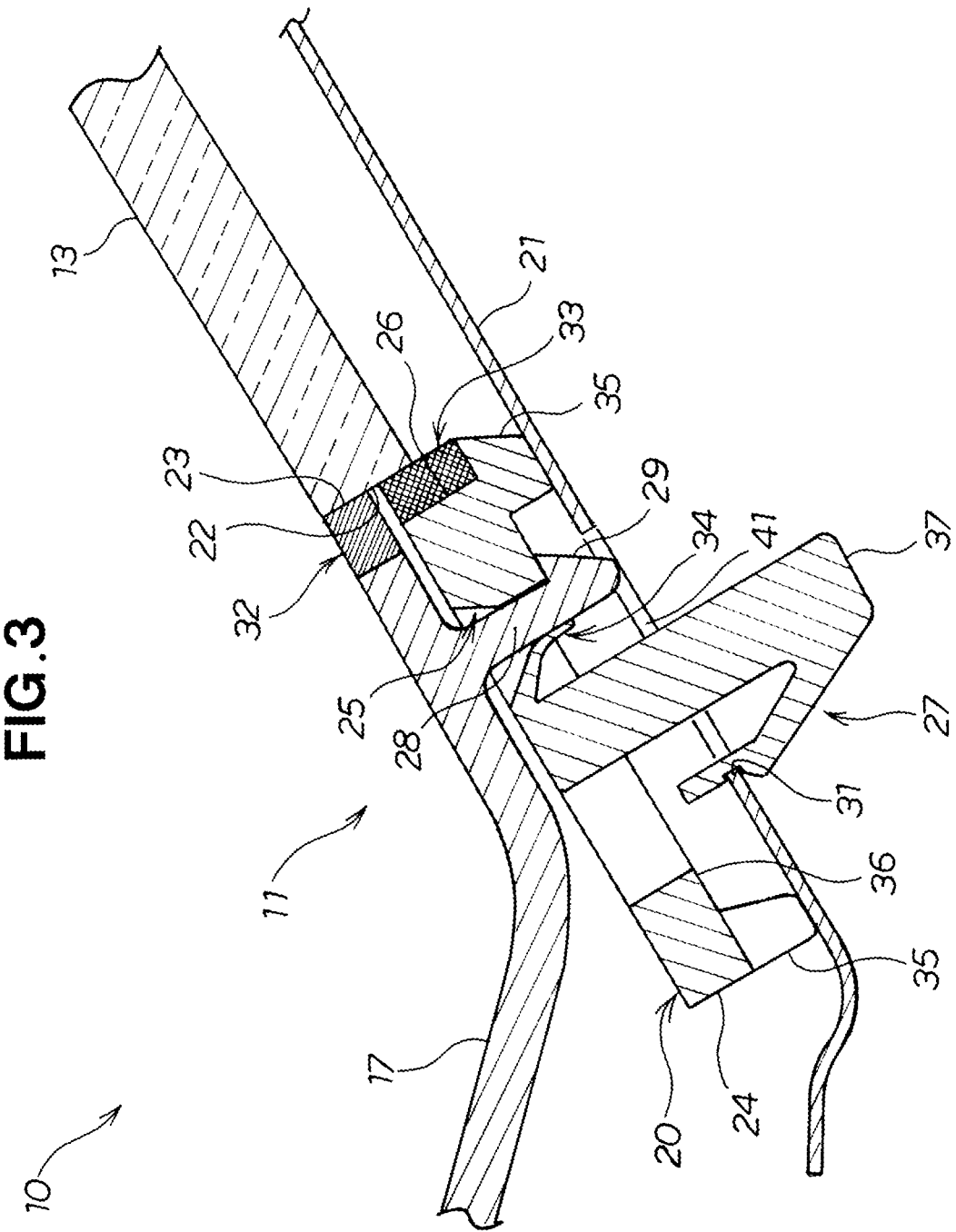
FIG. 3 is a cross-sectional view taken along line 3-3 of FIG. 1.
Figure 4:
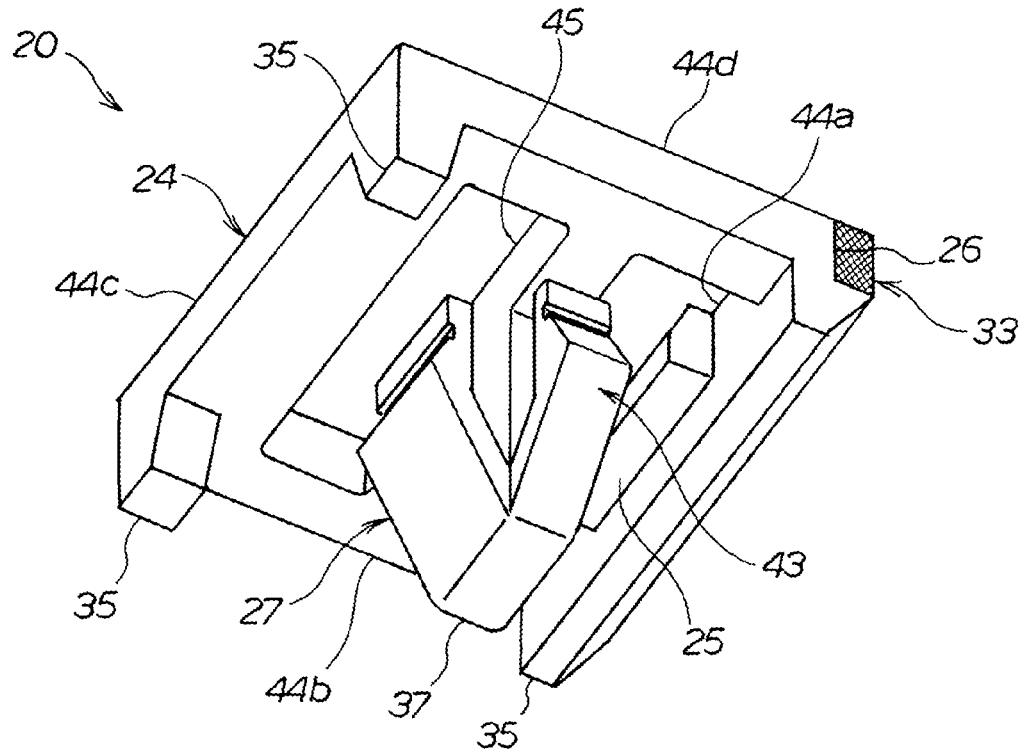
FIG. 4 is a perspective view of a clip shown in FIG. 2.
Figure 5:
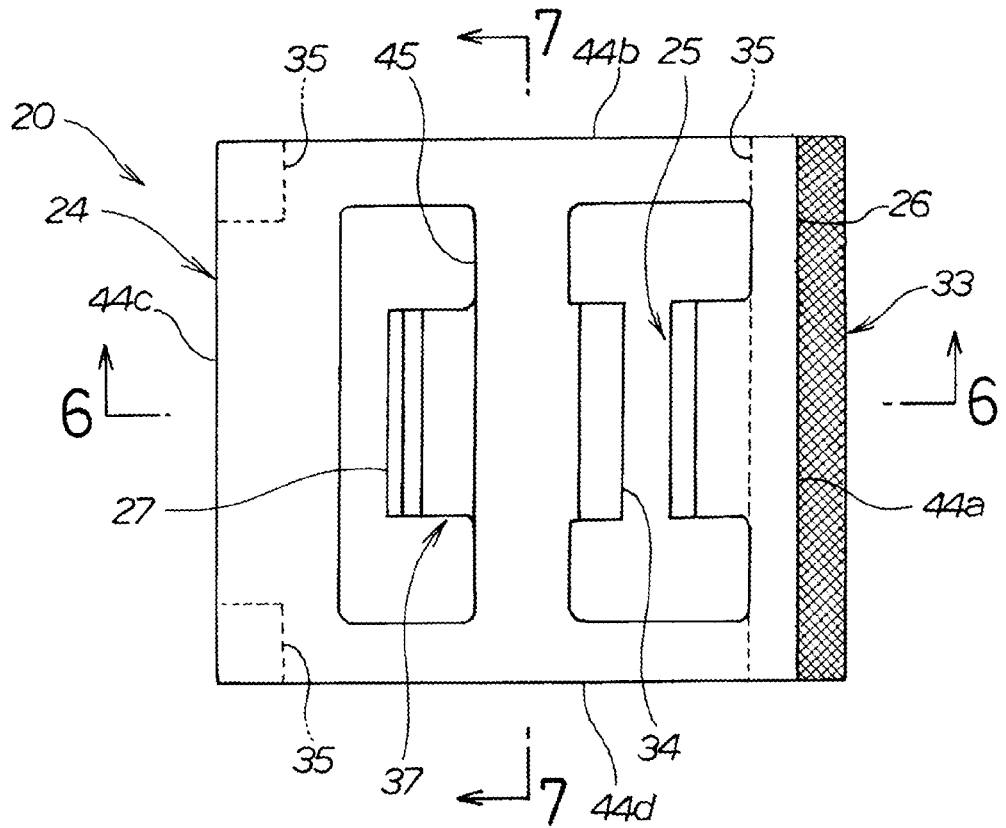
FIG. 5 is a plan view of the clip shown in FIG. 4.
Figure 6:
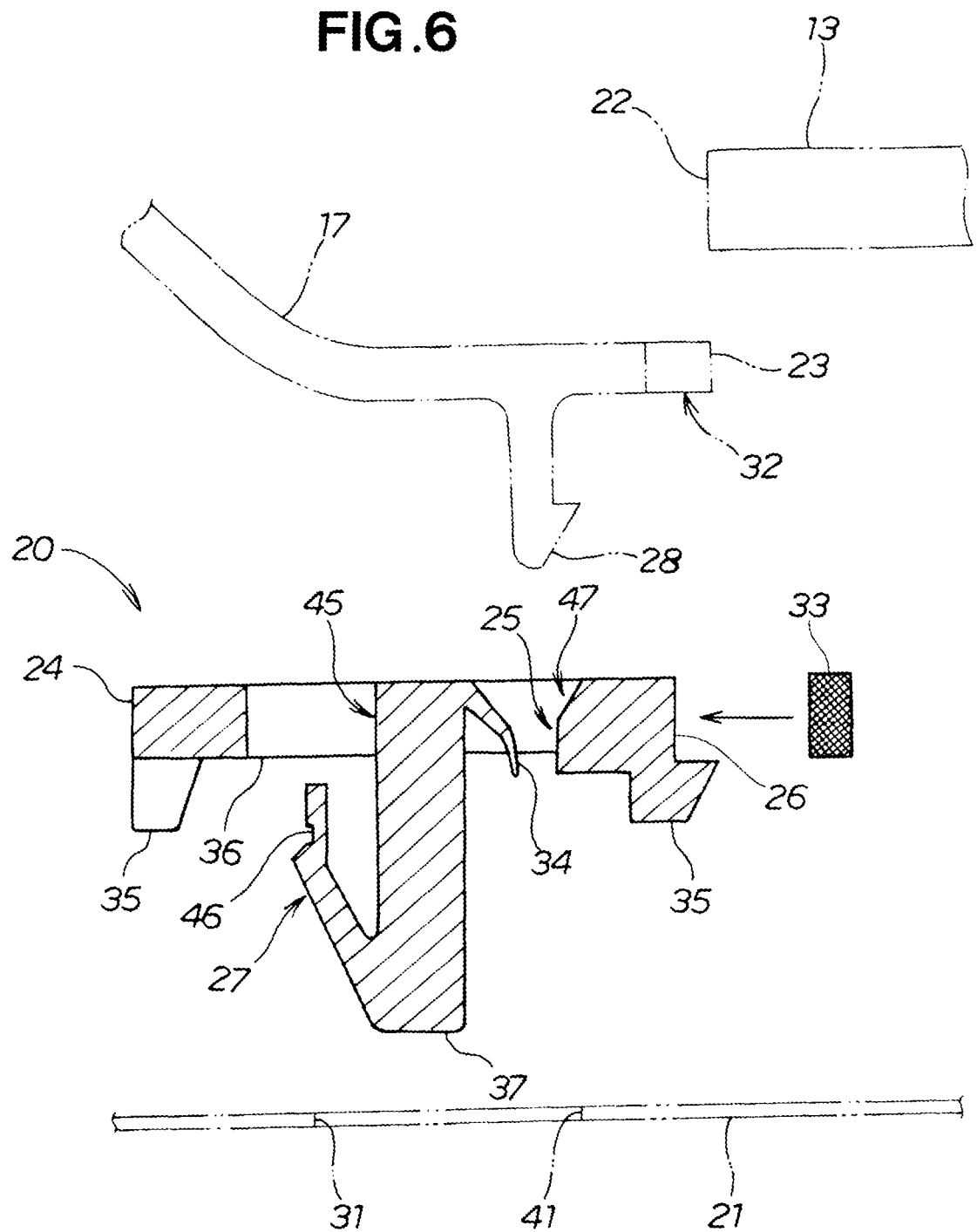
FIG. 6 is a cross-sectional view taken along line 6-6 of FIG. 5.

As shown in FIG. 3, the vehicular cowl top positioning structure includes a clip 20 mounted to a front part of a vehicle body 11 between a lower end surface 22 of a windshield 13 and a rear end surface 23 of a front cowl top 17. The clip 20 includes a cowl top mounting section 25 to which the front cowl top 17 is mounted with the rear end surface 23 thereof disposed face to face with the lower end surface 22 of the windshield 13, a windshield facing section 26 facing the lower end surface 22 of the windshield 13, and a reaction force generation section 27 for generating a reaction force tending to force the windshield facing section 26 against the lower end surface 22 of the windshield 13, wherein the reaction force generated by the reaction force generation section 27 causes the rear end surface 23 of the front cowl top 17 to abut against the lower end surface 22 of the windshield 13.

With this arrangement, it is possible to prevent generation of a gap between the windshield 13 and the cowl top 17 which may otherwise occur due, for example, to dimensional variations. Entry of foreign matters into the vehicle body can thus be prevented. Furthermore, the relative position between the windshield 13 and the front cowl top 17 can be determined more effectively and easily.

As shown in FIG. 3, in a state where the clip 20 is mounted to the vehicle body 11, the reaction force generation section 27 is located forwardly of the lower end surface 22 of the windshield 13 and has elasticity capable of generating the reaction force. This arrangement ensures that the front cowl top 17 including the clip 20 can be brought into abutment with the windshield 13 with simple construction.

As shown in FIGS. 3 and 7, the clip 20 is mounted to the vehicle body 11 in such a manner that the clip 20 is displaceable relative to the vehicle body 11 only in a longitudinal or front-rear direction of the vehicle. With this arrangement, the front cowl top 17 is prevented from moving in a lateral direction of the vehicle body 11, and the reaction force of the clip 20 acts only on the windshield 13 so that the abutting engagement of the front cowl top relative to the windshield can be achieved reliably with the necessary force.

The rear end surface 23 of the front cowl top 17 is provided with a cowl-top seal member 32 that provides a seal between the rear end surface 23 and the lower end surface 22 of the windshield 13. With this arrangement, since the cowl-top seal member 32 has elasticity and is brought into abutment with the windshield 13, the interface between the front cowl top 17 and the windshield 13 can be surely sealed to thereby prevent entry of foreign matters into the vehicle body 11.

The windshield facing section 26 is provided with a clip seal member 33 that provides a seal between the windshield facing section 26 and the lower end surface 22 of the windshield 13. With this arrangement, since the clip seal member 33 has elasticity and is brought into abutment with the windshield 13, the interface between the front cowl top 17 and the windshield 13 can be surely sealed to thereby prevent entry of foreign matters into the vehicle body 11.

As shown in FIG. 2, the clip 20 includes an engagement section 34 engaged with the front cowl top 17 while the clip 20 is mounted to the vehicle body 11. The engagement section 34 has elasticity acting in a direction to urge the front cowl top 17 toward the lower end surface 22 of the windshield 13. A biasing force generated by the engagement section 34 is set to be smaller than the reaction force generated by the reaction force generation section 27.

With this arrangement, since the elasticity of the engagement section 34 acts in a direction to urge the front cowl top 17 toward the lower end surface 22 of the windshield 13, the abutting engagement between the clip 20 and the windshield 13 can surely be maintained without causing accidental separation which may otherwise occur due to a reaction force of the front cowl top 17.

In a state where the clip 20 is mounted to the vehicle body 11, the engagement section 34 is located closer to the lower end surface 22 of the windshield 13 than the reaction force generation section 27. With this arrangement, because the distance from the engagement section 34 to the lower end surface 22 of the windshield 13 is relatively short, the front cowl top 17 can be readily brought into abutment with the lower end surface 22 of the windshield 13 without causing distortion. This will contribute to an improvement in the sealing properties.

Although in the illustrated embodiment, the reaction force generation section 27 extends obliquely upward from a lower end of the downwardly-extending stem section 37, the present invention should by no means be limited to the illustrated arrangement but may include any form of modifications provided that a reaction force generated by the reaction force generating section 27 is able to urge the clip 20 toward a rear of the vehicle. For example, the reaction force generation section 27 may extend obliquely downward from an upper end of the stem section 37 or it may extends continuously from an upper end to a lower end of the stem section 37 so as to form an arch.

INDUSTRIAL APPLICABILITY

With the arrangements so far described, the present invention can be used advantageously as a vehicular cowl top positioning structure for positioning a front cowl top relative to a windshield of a vehicle.

REFERENCE SIGNS LIST

10: vehicle
11: vehicle body
13: windshield
17: front cowl top (cowl top)
20: clip
22: lower end surface
23: rear end surface
25: cowl top mounting section
26: windshield facing section
27: reaction force generation section
31: stopper
32: cowl-top seal member
33: clip seal member
34: engagement section

The invention claimed is:

1. A vehicular cowl top positioning structure comprising:
a windshield;
a front cowl top; and
a clip mounted to a front part of a vehicle body and disposed between the front cowl top and the vehicle body,
wherein the clip includes:
a cowl top mounting section to which the front cowl top is mounted with a rear end surface thereof disposed face to face with a lower end surface of the windshield;
a windshield facing section facing the lower end surface of the windshield; and
a reaction force generation section for generating a reaction force tending to force the windshield facing section against the lower end surface of the windshield,
wherein the reaction force generated by the reaction force generation section causes the rear end surface of the front cowl top to abut against the lower end surface of the windshield.

2. The vehicular cowl top positioning structure according to claim 1, wherein, in a state where the clip is mounted to the vehicle body, the reaction force generation section is located on a forward side of the lower end surface of the windshield in a longitudinal direction of the vehicle body and has elasticity capable of generating the reaction force.

3. The vehicular cowl top positioning structure according to claim 1, wherein the clip is mounted to the vehicle body in such a manner that the clip is displaceable relative to the vehicle body only in a longitudinal direction of the vehicle body.

4. The vehicular cowl top positioning structure according to claim 1, wherein the rear end surface of the front cowl top is provided with a cowl-top seal member that provides a seal between the rear end surface of the front cowl top and the lower end surface of the windshield.

5. The vehicular cowl top positioning structure according to claim 1, wherein the windshield facing section is provided with a clip seal member that provides a seal between the windshield facing section and the lower end surface of the windshield.

6. The vehicular cowl top positioning structure according to claim 1, wherein the clip includes an engagement section engaged with the front cowl top while the clip is mounted to the vehicle body, the engagement section having elasticity acting in a direction to urge the front cowl top toward the lower end surface of the windshield, a biasing force generated by the elastic engagement section for urging the front cowl top being set to be smaller than the reaction force generated by the reaction force generation section.

7. The vehicular cowl top positioning structure according to claim 6, wherein, in a state where the clip is mounted to the vehicle body, the engagement section is located closer to the lower end surface of the windshield than the reaction force generation section.

* * * * *